May 21, 1935.    G. L. KYLE    2,002,267
STORAGE BATTERY CONSTRUCTION
Filed Nov. 25, 1927    4 Sheets-Sheet 1

INVENTOR.
George L. Kyle
BY
ATTORNEY

May 21, 1935.   G. L. KYLE   2,002,267
STORAGE BATTERY CONSTRUCTION
Filed Nov. 25, 1927   4 Sheets-Sheet 2

INVENTOR.
George L. Kyle
BY Raymond H. Van Meer
ATTORNEY

May 21, 1935.  G. L. KYLE  2,002,267
STORAGE BATTERY CONSTRUCTION
Filed Nov. 25, 1927  4 Sheets-Sheet 3
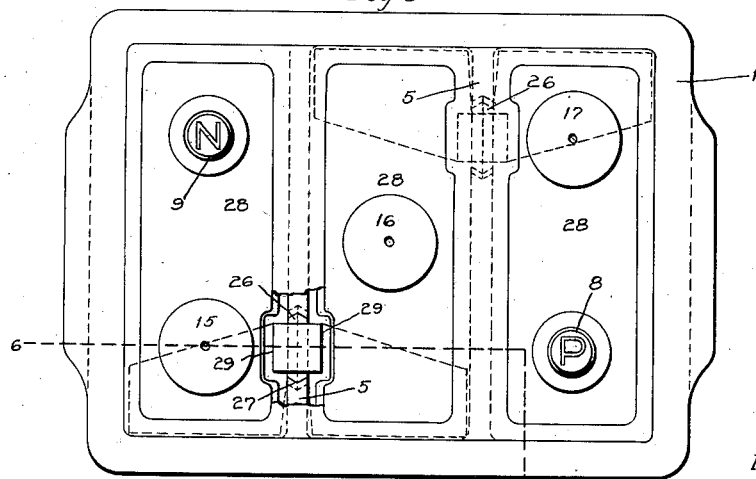
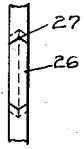
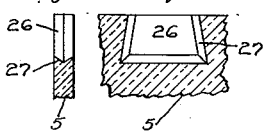
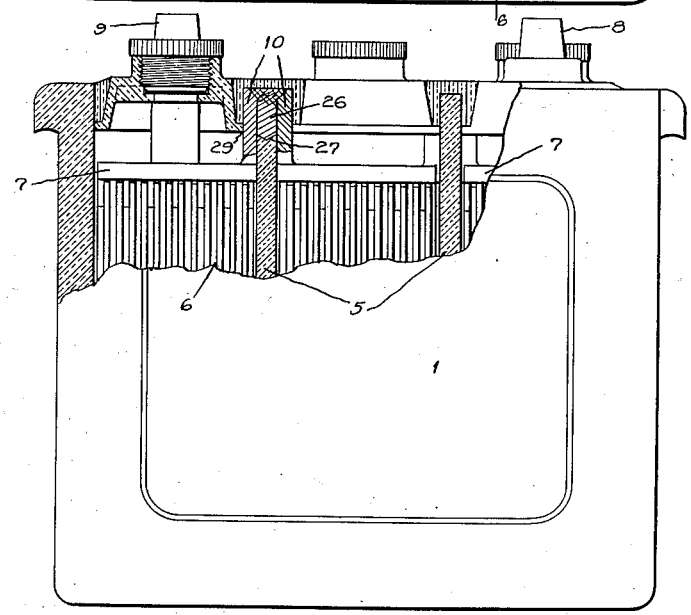
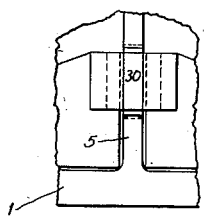
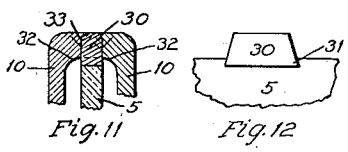
INVENTOR.
George L. Kyle
BY Raymond K. Van Vleet
ATTORNEY May 21, 1935. G. L. KYLE 2,002,267
STORAGE BATTERY CONSTRUCTION
Filed Nov. 25, 1927 4 Sheets-Sheet 4

INVENTOR.
George L. Kyle
BY Raymond K. Van Kest
ATTORNEY

Patented May 21, 1935

2,002,267

UNITED STATES PATENT OFFICE 2,002,267

STORAGE BATTERY CONSTRUCTION

George L. Kyle, Niagara Falls, N. Y., assignor to U S L Battery Corporation, Niagara Falls, N. Y., a corporation of New York Application November 25, 1927, Serial No. 235,601

7 Claims. (Cl. 136—134)

This invention relates to improvements in storage battery construction.

The invention has to do with the mechanical construction as distinguished from the electro-chemical features of a storage battery whereby a battery of improved appearance, increased efficiency and lesser cost of material is obtained.

More particularly the invention relates to means for connecting the various cells of a multi-cell storage battery together.

The popular storage battery such as is generally used in starting and lighting systems for automobiles and as a source of A power for radio receiving sets, comprises a plurality of cells, generally three in number, contained in a single container or case. Each cell comprises a plurality of positive plates consisting essentially of lead, joined together by lead straps or bars to form a positive group, and a similar set of negative plates similarly joined together to form a negative group. As the cells are generally arranged in series in a complete battery, the positive group of one cell is joined by lead links or connectors to the negative group of the adjacent cell and the positive group of one end cell and the negative group of the opposite end cell are provided with terminal posts forming positive and negative terminals of the battery. Surrounding the plates in each cell is the electrolyte of sulphuric acid. The top of each cell is provided with a cover which is sealed to the cell so as to be acid-tight.

In the constructions heretofore generally used, the connections between the cells have been made by cell posts on each positive and negative group strap, which posts extend through the cell covers. The adjacent positive and negative posts on adjacent cells are joined together by lead links which are lead-burned or welded to the cell posts and which extend from cell to cell above the covers.

Such a construction has several recognized disadvantages. First, the numerous cell posts projecting through the covers make a battery of unsightly appearance, especially in a radio battery where appearance is an object. Also, it is exceedingly difficult to bring the cell posts through the covers with an acid-tight seal. Unless the seal is acid-tight, acid seepage occurs which causes the tops of the cells to become moist with acid, resulting in corrosion of the terminals and further unsightly appearance of the battery. Second, the path of the current from cell to cell is unnecessarily long when the cell connections are made above the cell covers. This unnecessarily increases the internal resistance of the battery. Third, the amount of lead required to form the cell posts and inter-cell links is unnecessarily great, and as lead comprises the greatest element of cost in a storage battery, and is of relatively high cost per pound, the increased cost becomes an important item.

An object of the present invention is to provide a storage battery having a minimum of projections above the battery covers whereby improved appearance and a minimum liability of acid seepage on to the covers is obtained.

A further object is to provide a storage battery in which the internal current path between cells is reduced to the minimum.

A further object of the invention is to provide a storage battery of given capacity and output in which a minimum amount of lead is used in inter-cell connections.

A further object of the invention is to provide an improved method of burning the connecting battery straps of adjacent cells of a storage battery to inter-cell connectors.

This invention lends itself particularly to use in storage batteries in which the cells are contained in a unitary multi-compartment case or container molded from some suitable composition, which molded containers have of recent years come into almost universal use. Its use, however, is not confined to such containers, as many of the advantages may also be obtained when the invention is used with vulcanized rubber cases.

In describing the invention, reference will be made to a one-piece molded composition container, although the application of some forms of the invention to other types of containers will be readily understood.

In the accompanying drawings:—

Fig. 5 is a view similar to Fig. 1 and Fig. 3, but showing a preferred form of the invention.

Fig. 6 is a side elevation, partly in section, on the line 6—6 of Fig. 5.

Fig. 7 is a top view of a portion of one of the inter-cell partitions.

Fig. 8 is an end view of the lead insert shown in Fig. 7.

Fig. 9 is a view at right angles to Fig. 7, with a portion of the partition in section to show the lead insert.

Fig. 10 is a top plan view of a fragment showing a modified form of lead insert.

Fig. 11 is a vertical section through a partition showing the insert illustrated in Fig. 10.

Fig. 12 is a side view of a fragment of the partition illustrating the insert of Figs. 10 and 11.

Throughout the various figures the same reference characters are used to designate similar parts of the battery.

Figure 1:
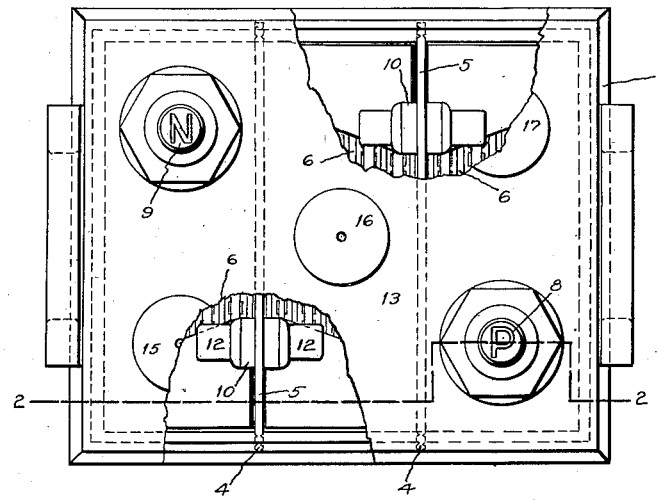
Fig. 1 is a top plan view of a battery with portions of the covers broken away to show one form of the invention.
Figure 2:
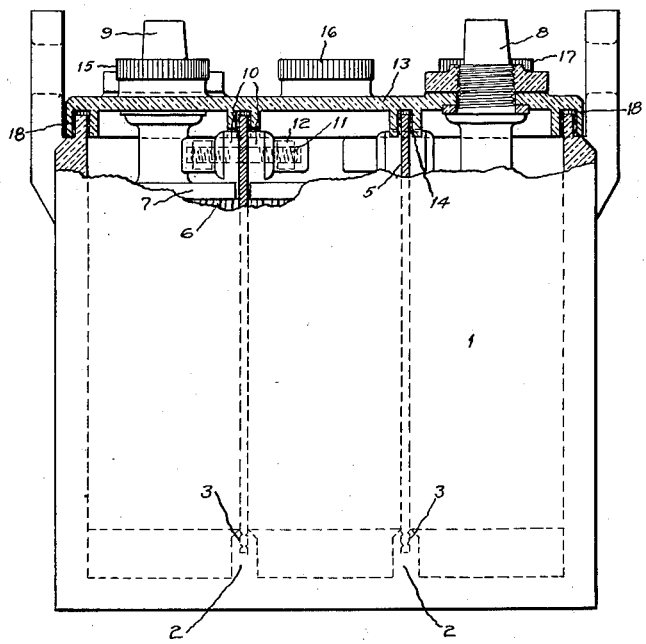
Fig. 2 is a side elevation, partly in section, on the line 2—2 of Fig. 1.

Referring to Figs. 1 and 2, the battery case is designated 1. In this form the case may be of molded form of either composition or rubber. The case is molded with upstanding projections 2 in the bottom, extending transversely of the case from wall to wall. The projections 2 are provided with grooves 3 which connect with similar grooves 4 extending vertically up the inside of the side walls of the case. Into these grooves are fitted and sealed by any suitable means, partitions 5 which extend approximately the same height as the end and side walls of the case. In this form the partitions may be of metal or suitable non-conducting material. The partitions are equidistant from each other and from the ends of the case, thus dividing the case into a plurality of similar compartments to form the various cells. In the usual construction there are three such cells. In each cell the usual positive and negative plates 6 are burned together into positive and negative groups, the plates of each group being connected by similar lead straps 7. The positive strap of the right hand cell, Fig. 1, is connected to the positive terminal post 8 and the negative strap of the left hand cell is connected to the negative post 9. Each of the other positive and negative straps is provided with an up-turned end 10, which extends upwardly in close contact with the adjacent cell partition. The strap ends on opposite sides of the partition will lie directly opposite each other. Through the upturned ends 10 of adjacent straps and through the intervening partition 5 a bolt 11 extends and nuts 12 lightly clamp the strap ends to the partition and to each other. The bolts 11 should be of good conducting material not readily attacked by electrolyte, such as lead or antimonial lead. A single cover 13 is provided on its under side with projecting flanges forming the grooves 14 to receive the upper edges of the partitions 5. Suitable sealing compound or other acid-proof packing will be arranged in the cover grooves to prevent the electrolyte from the cells passing from one cell to the next. Suitable vent and filling openings in the cover, one for each cell, are provided and closed by the usual vent caps 15, 16 and 17. The vent openings should preferably be arranged in a diagonal line between opposite corners of the cover as shown, both for the symmetrical appearance and to facilitate testing of the individual cells without dis-assembling the battery. Thus a cell voltage reading on the left hand cell may be taken by connecting a volt meter to the negative post 9 and through vent 15 to the positive strap of the cell. A reading on the right hand cell may similarly be made between the positive post and the negative strap of the cell through vent 17. A reading on the middle cell may be made between the positive strap under vent 15 and the negative strap under vent 17. The cover will be suitably sealed to the case as by a sealing groove and sealing compound 18.

Figure 3:
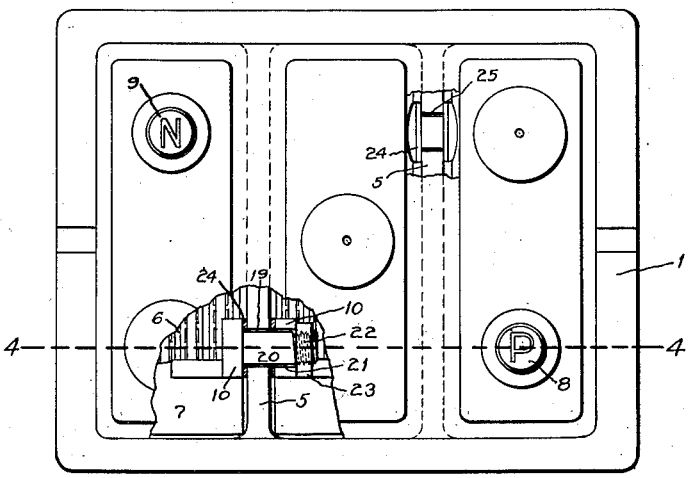
Fig. 3 is a top plan view of a battery with portions of the cover broken away to show a modification of the invention.
Figure 4:
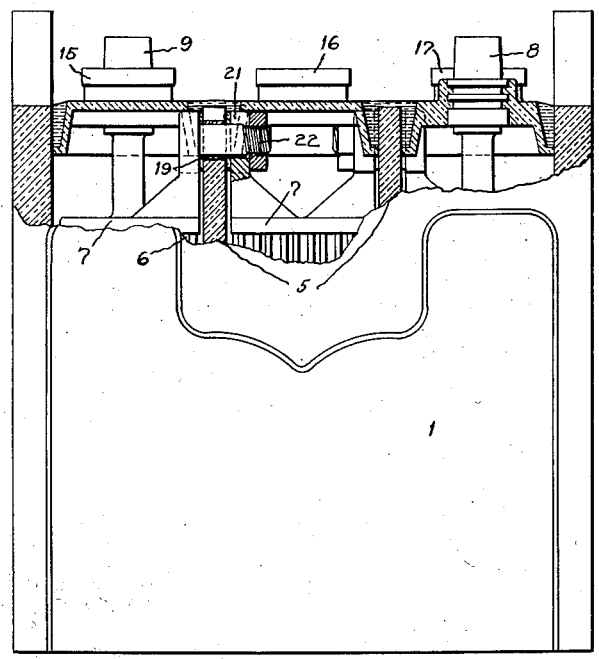
Fig. 4 is a side elevation, partly in section, on the line 4—4 of Fig. 3.

In Figs. 3 and 4 the case is shown as of the one-piece molded type in which inter-cell partitions are integrally molded with the case. The upper edge of each partition 5 is suitably notched as at 19. One strap end 10 of each adjacent pair of strap ends has formed integrally therewith a stud 20 which projects laterally toward the adjacent cell partition and is adapted to lie in one of the notches 19. The complementary strap end 10 in the adjacent cell is perforated as at 21 to receive the projecting stud 20 on the other strap end. The stud 20 is preferably screw-threaded as at 22 and a nut 23 will draw the parts closely and firmly together. In order to make an acid-tight seal around the stud 20, suitable insulating washers 24 may be arranged on opposite sides of the partition around the stud, which washers will be tightly compressed when the parts are assembled. In this form the battery may have individual covers for each cell which will be of the usual dished form with the side flanges suitably notched to accommodate the studs 20. The covers will be sealed by flowing the tops with compound, as in the usual construction. In the upper portion of Fig. 3 the compound is shown broken away to expose the stud and strap ends in relation to the flanges of the covers. If desired a rubber or other insulating bushing 25 may surround the stud as shown in this portion of Fig. 3 to further decrease the likelihood of acid leakage between the cells.

Referring to Figs. 5 to 9, the case is of the unitary 3-compartment type molded from composition or rubber. Appropriately located in each inter-cell partition 5 is a lead insert 26. The insert 26 is preferably molded into the partition in the manufacture of the case by inserting the insert in the plunger of the molding press. It is preferably trapezoidal in form, as shown in Figs. 7 to 9, with its lower edge wider than its upper edge to securely anchor it in the partition. The side and bottom edges are preferably wedge-shaped as shown at 27 to insure an acid-tight seal between the insert and the partition and to present a maximum of interfitting surfaces to prevent acid seepage between the insert and partition. The inserts in Figs. 5 to 9 are embedded in the partition 5 so that the upper edges are flush with the upper edges of the partition. The positive and negative groups are provided with positive and negative straps 7 having up-turned ends 10 as in Figs. 1 and 2. The up-turned strap ends 10 are burned to opposite side faces of the inserts 26 to form a unitary connector integral with both straps. Preferably separate covers 28 are provided for each cell. Each cover is appropriately notched as at 29 to accommodate the up-turned strap ends 10. After the covers are in place, the grooves between the cover walls are filled with sealing compound to secure the covers in place and to prevent seepage of acid along the strap ends to the top of the battery.

Figs. 10, 11 and 12 illustrate a modified form in which the connector 30 is not embedded in the partition 5 but is merely anchored in place by having its wide base 31 molded in place in the partition 5 with the connector itself projecting above the top edge of the partition. The strap ends may be bent over as at 32 and burned to the connector as at 33. Obviously, the strap ends in Figs. 10 and 11 and in Figs. 5 and 6 may extend closely adjacent the partitions or be bent over as at 32, if desired.

Figure 13:
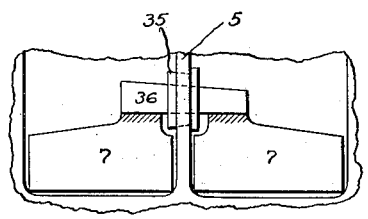
Fig. 13 is a top view of a further modified form of connector.
Figure 14:
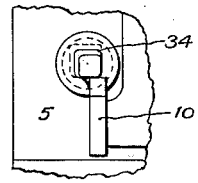
Fig. 14 is an end view of the connector shown in Fig. 13.

Figs. 13 and 14 illustrate a modified form in which the partitions 5 are provided with tapered openings 34 appropriately placed below the top edge. A bushing 35, preferably of soft rubber, is placed in the opening 34 and a lead bar 36 tapered toward one end is driven snugly into the bushing and projects from each side of the partition to form an inter-cell connector which is sealed acid-tight in the partition by the bushing. The upturned strap ends 10 are burned to the opposite ends of the bar 36.

Figure 15:
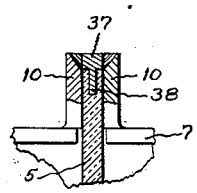
Fig. 15 is a section through a further modified form of connector.

In Fig. 15 the inter-cell connector is in the form of a bar 37 having anchor pins 38 which may be dipped into a sealing compound and pressed into holes drilled into the partition 5, or the bars and pins may be molded in place in the molding of the case. The strap ends 10 are burned to the opposite sides of the bar 37.

Figure 16:
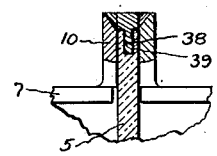
Fig. 16 is a section through a further modified form of connector.

Fig. 16 illustrates a slightly modified form in which the pin portion 38 is provided with ridges 39. The pins are dipped in sealing compound and pressed into holes drilled into the partition. The strap ends 10 are burned to the bar 37, as in Fig. 15.

Figure 17:
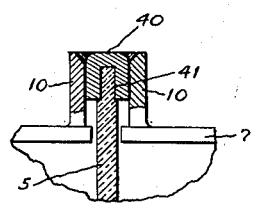
Fig. 17 is a section through a further modified form of connector.

In Fig. 17 an inverted U-shaped piece of lead 40 is pressed over the top of the partition 5 which is slightly grooved as at 41 to receive the connector. The strap ends 10 are burned to the outer face of the legs of the connector 40.

Figure 18:
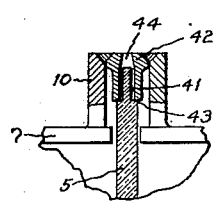
Fig. 18 is a section through a further modified form of connector.

Fig. 18 illustrates a modification of the form shown in Fig. 17. In this form the upper edge of the partition 5 is grooved out as at 41 and an inverted U-shaped connector 42 is loosely placed over the partition edge and rests on the shoulders 43. The connector is of wider span than the thickness of the wall 5 and is provided with a central opening 44 in the base of the U. Compound forced into the opening 44 will fill the space between the connector and partition 5 and seal the parts tightly together. The strap ends are burned to the legs of the connector as in Fig. 17.

Figure 20:
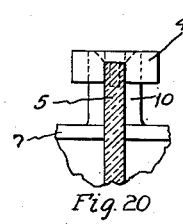
Fig. 20 illustrates a form of Fig. 19 in place preparatory to burning the parts together.
Figure 21:
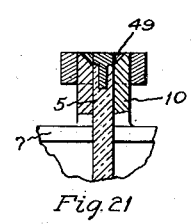
Fig. 21 is a vertical section through Fig. 20.
Figure 19:
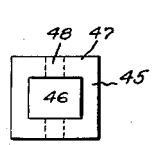
Fig. 19 is a plan view of a form in use in burning the straps of battery cells to the inter-cell connectors.

Figs. 19, 20 and 21 illustrate a convenient method which has been devised for burning the adjacent strap end 10 to the inter-cell connector.

Fig. 20 shows a form 45 of steel. The form 45 is of rectangular shape with a rectangular central opening 46 of sufficient size to receive the up-turned ends 10 of adjacent straps and the cell connector such as the insert 26, Fig. 5, the connector 30, Fig. 10, or any of the connectors in Figs. 15 to 18. The side walls 47 of the form are notched as at 48, the notches on both side walls being in alignment and being sufficiently wide to receive the inter-cell partition. By placing the form 45 over the strap ends and the connector with the notch 48 astride the partion 5, as shown in Fig. 20, the parts will be held together and a proper form provided into which melted lead may be puddled to integrally unite the strap ends and the connector. In Fig. 21 the puddled lead forming the integral connector is shown at 49.

It is obvious that if desired some of the advantages of the invention may be realized by embedding the connectors in the side walls of the casing with the opposite ends of the connectors on opposite sides of the intercell partitions 5. Preferably in this form also the upper edges of the connectors will be flush with the upper edges of the casing walls to permit the connectors to be molded in situ in the process of molding the container, as in Figs. 5 to 12. The strap ends 10 will be burned to the portions of the connectors on the respective sides of the partitions.

It is to be noted that the various methods of inter-connecting battery cells herein described lend themselves especially to the present day molded battery container. Such containers are molded in hydraulic presses in a single molding operation. It is therefore not feasible to mold inserts into the case partition except at the free edges of the partition. Where for any reason it is desired to have the cell connectors arranged below the upper edges of the partitions, resort must be had to the bolted form or the form illustrated in Figs. 13—14. As the necessity of disassembling the battery frequently occurs in service, the accessibility of the connections is important. The various forms may be readily disassembled, but the preferred form in Figs. 5 to 12 best adapts itself to all requirements. Not only may the insert be molded in place in the manufacture of the case, but the parts are easily accessible and may be readily disassembled. All that is necessary to disassemble is to remove the cover, when with the knife edge and a sharp blow the strap ends may be easily severed from the connector to permit disassembling of any cell.

The various forms of the invention provide a battery of neat appearance having a minimum of projecting parts above the top surface, presenting a minimum possibility of acid creepage to the battery top, insuring a minimum of internal resistance in the battery and resulting in a large saving in the amount of lead used, without in any degree increasing the labor of manufacturing or the difficulty of disassembling and repair and without interfering in any way with the efficiency and operation of the battery in all classes of service.

What I claim as new and desire to secure by Letters Patent of the United States is:

1. A multi-cell storage battery comprising, in combination, a container structure, plate groups, individual cell covers having depressed marginal portions defining sealing grooves, plastic sealing material in the grooves, and inter-cell conductors having U-portions within said grooves, embedded in the sealing material.

2. A storage battery comprising a container having a partition therein forming two separate compartments, a separate cover for each of said compartments, said covers having depressed marginal portions engaging said partition below the top edge thereof defining sealing grooves, two battery elements in the separate compartments each having a post projecting up closely adjacent opposing sides of the partition therebetween, a metallic member electrically connecting said opposing posts and lying in the said sealing grooves, and sealing material in the said grooves sealing the joints between the covers and partition and between the posts and cover.

3. A storage battery comprising a cellular container including an impervious inter-cell partition having a depressed upper edge, plate groups in the cells, upwardly-dished individual cell covers forming, with the container, marginal sealing grooves including a double groove embracing the upper edge of said partition, a U-shaped inter-cell conductor connecting the plate groups and crossing the partition above the bottom of said double groove, and plastic material in said grooves sealing said conductor and the joints between the covers and the container and completely covering the conductor in said double groove.

4. A storage battery comprising a unitary cellular container having an impervious partition between cells, plates in said cells, upwardly dished individual covers fitted within the cells and forming with the container upwardly-exposed sealing grooves including a double groove embracing the upper edge of said partition, a plate-connecting inter-cell conductor having a U-portion passing between the covers and partition and crossing the latter wholly above the marginal portions of the covers, and plastic material in said receptacle for sealing the joints between the covers and container, said material completely embedding said U-portion of the inter-cell conductor in the receptacle and serving completely to seal said conductor without the aid of compression packings.

5. A storage battery comprising a cellular container including an impervious inter-cell partition having a depressed upper edge, plate groups in the cells, upwardly-dished individual covers for the cell chambers forming, with the container, marginal sealing grooves including a double groove embracing the upper edge of said partition, plastic material in the grooves, covering said depressed upper edge of said partition and sealing the joints between the covers and the container, and a U-shaped inter-cell conductor in said double groove, crossing the partition wholly above the edges of the cell covers and having legs springing from the plate groups immediately adjacent to the partition, the portion of said conductor above the cell chambers being wholly embedded under and completely sealed solely by said plastic material.

6. A storage battery comprising a container having inter-cell partitions therein forming separate compartments, metallic inserts fixed at the top edge of said partitions, battery elements in the separate compartments each having inter-cell connectors joined to said inserts, a separate cover for each of said compartments, said covers having depressed marginal portions below the top edge thereof defining sealing grooves, and sealing material in the said grooves sealing the joints between the covers and partitions, and between connectors and covers.

7. A storage battery comprising a unitary container having integral inter-cell partitions terminating below the side and end walls of said container forming separate cells therein adapted to hold positive and negative groups of battery plates and liquid electrolyte in each cell, metallic inserts of substantially the same thickness as said partitions in each inter-cell partition wholly above the normal electrolyte level and having one edge exposed at the top edge of the partition and an exposed surface in each of the two adjacent cells, said inserts being wider throughout their body portion than at said exposed edge to fix the same against movement and being wedge shaped along unexposed edges thereof to insure intimate contact with said partitions, battery elements in each separate cell each having an inter-cell connector joined to said inserts, a separate cover for each of said cells, said covers having depressed marginal portions below the top edge of said cells defining sealing grooves, and sealing material in the said grooves sealing the joints between the respective covers and partitions, and between connectors and covers.

GEORGE L. KYLE.